Sept. 13, 1949.    Q. FRAZIER    2,481,505
SHOCK ABSORBING MEANS
Filed Nov. 23, 1945

INVENTOR.
QUENTIN FRAZIER
BY William D. Hall
Attorney.

Patented Sept. 13, 1949

2,481,505

UNITED STATES PATENT OFFICE 2,481,505

SHOCK ABSORBING MEANS

Quentin Frazier, West Long Branch, N. J., assignor to the United States of America as represented by the Secretary of War Application November 23, 1945, Serial No. 630,513

6 Claims. (Cl. 248—358)

(Granted under the act of March 3, 1883, as amended April 30, 1928; 370 O. G. 757)

1

The invention described herein may be manufactured and used by or for the Government for governmental purposes, without the payment to me of any royalty thereon.

The present invention relates to shock absorbing means.

With the tremendous use of highly sensitive electronic and electrical devices, a need has arisen for suitable mounting means to sustain such apparatus or components thereof and protect them from vibrations and shocks incident to transportation, to vehicular use and the like. In order to completely protect such equipment, the mounting means should be such as to have compliance and shock absorbing qualities in all directions, so as to isolate the equipment from shock in all directions, irrespective of the position in which the equipment is sustained.

It is therefore an object of the present invention to provide means for shock mounting apparatus which allow movements thereof in all directions and which absorb shocks implicit in such universal movements.

It is a further object of the present invention to provide means for mounting sensitive equipment which allow its center of gravity to be so positioned as to eliminate or at least minimize harmful effects due to shock.

It is a further object to provide a shock absorbing carrying case for delicate instruments and the like.

These and other objects and advantages of the present invention, which will be better understood as the detailed description thereof progresses, are obtained in the following manner.

There are provided preferably at least three volute springs, each of which is made of an elongated plate of springy metal rolled into a spiral form and has an axially positioned rod extending through, and secured to, its innermost turn to which a load may be secured. Each spring is held in a suitable spring housing which secures the outer turn thereof. A preferred embodiment, as illustrated in the drawings annexed hereto, comprises a case, into which the housings of four of such volute springs are secured, and a rigid framework, carried by rods extending axially through said four springs, to which a load, such as an electrical instrument, may be secured. Preferably the center of gravity of the load and the framework is in a plane which extends through the midpoints of the four springs.

It will be understood that the present application is not to be limited to any particular number of springs, it being possible to shock mount

2 a load upon a single spring as described above, in which event the load should be so distributed about the axially disposed shaft, or so counterbalanced, that the center of gravity of the entire load carried by the spring is located at the midpoint of said spring.

In the accompanying specification there is described, and in the annexed drawings shown, what at present is considered preferred embodiments of the present invention. It is however to be understood that said invention is not limited to said embodiments inasmuch as changes therein may be made without the exercise of invention and within the true spirit and scope of the claims hereto appended.

Figures 1, 2, 3:
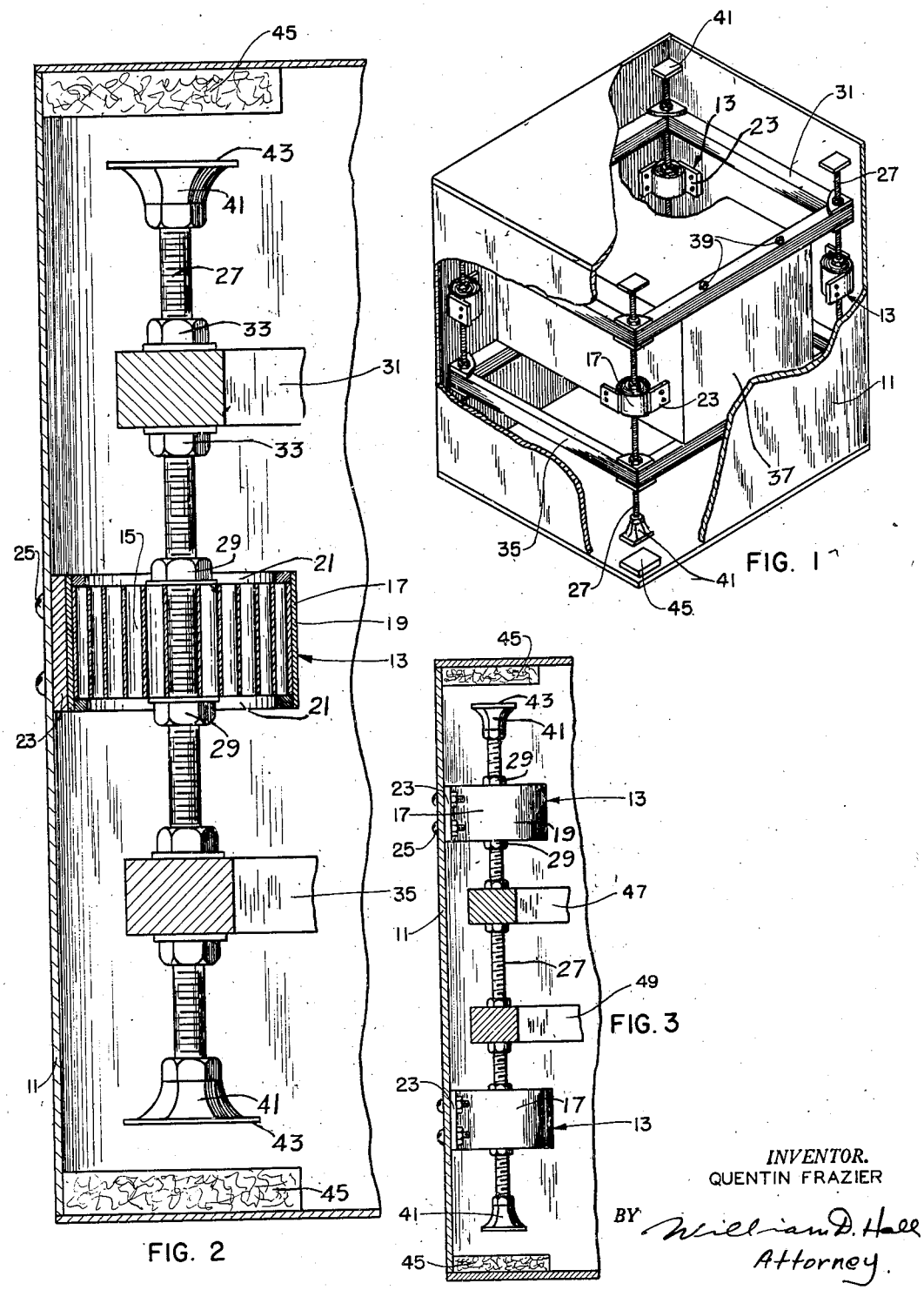
Figure 1 is an isometric view, partly broken away, of an electrical instrument shock mounted in a carrying case embodying the present invention.
Figure 2 is an elevational view, partly sectioned, of one of the shock mounts and associated parts of Figure 1.
Figure 3 is an elevational view of a modified form of shock mount.

Referring now particularly to Figures 1 and 2 of the drawings, the embodiment of the present invention there illustrated comprises a rectangular case 11 into each of the four corners of which is secured a shock mount 13. Each such shock mount 13 includes a spring 15 which is made up of a length of flat spring steel stock coiled into a volute shape. The four said springs 15 are disposed so that their axes are mutually parallel and the midpoints of all four springs lie in a single plane normal to said axes. The outer layer of each spring 15 is encompassed and rigidly held within a snugly fitting spring housing 17 which comprises a tubular sleeve 19 provided with two rings 21 suitably secured respectively within the opposite ends of said sleeve. Each such spring housing 17 also includes two metal straps 23, welded or otherwise securely fastened thereto at right angles to each other, by which said housing is secured to the walls of the case 11, as by bolts 25.

An elongated threaded rod 27 extends through the axis of each of said springs 15 and is held rigidly secured to the inner turn thereof by washers and nuts 29 positioned both above and below each spring.

A rigid rectangular upper frame 31, pierced by four corner holes receivable to the rods 27, is positioned above the four springs 15 and spaced a sufficient distance therefrom so as not to interfere with their operation. The four rods 27 respectively extend through the four holes in said upper frame 31 and said frame is rigidly secured to said rods by washers and nuts 33 threaded upon said rods above and below said frame. A similar lower frame 35 is likewise rigidly secured to the four rods 27 a like distance below the four springs 15. An electrical instrument 37 is rigidly fastened to the upper and lower frames 31, 35 as by the bolts 39, the said instrument being so positioned that its center of gravity is in the plane aforementioned which passes through the midpoints of the four springs 15.

Threadably secured to each end of each of the rods 27 is a snubber plate 41 provided with a flat surface 43, normal to the rod axis, at its extremity. A snubber pad 45, of soft resilient material such as sponge rubber, is attached to the interior of the case 11 at each of the four corners of the top and bottom walls thereof. Said snubber pads 45 are aligned with the rods 27 and are spaced from the snubber plates 41.

In the use of the device just described, the shock mounts 13 will allow the instrument 37 to move in all directions relative to the case 11 and will provide shock absorption during all such movements in view of the inherent damping characteristics of the material of which the springs 15 are constructed. Under deflections in an axial direction, the springs 15 will allow a relatively long deflection which will prevent or minimize the transmission of any shocks from the case 11 to the instrument 37 itself. Under deflections in a lateral direction, as the outer turns of the volute springs 15 make contact with each other, the resistance to further deflection becomes progressively greater so as to bring the deflection to a stop with little, if any, jar to the instrument 37.

Although the structure described is preferably to be so proportioned that all shocks and vibrations which may be sustained will be isolated from the instrument without the snubber plates 41 ever undergoing sufficient deflection to make contact with the snubber pads 45, nevertheless it is advisable to include said plates and pads to receive and break any abnormal shocks which may occur, as where the entire assembly were accidentally dropped.

By positioning the center of gravity of the suspension in the same plane as the midpoints of all of the springs 15 any tendency to rock or "pendulum" is avoided and also the spring suspension and shock absorbing qualities are effective in all directions no matter to what position the case 11 may be turned during transit or when installed for use.

A modified form of the present invention is illustrated in Figure 3. Said modification is similar to the form already described except that each of the rods 27 is provided with two spaced shock absorbers 13 for a total of eight of such absorbers. The instrument (not shown) carried by said shock mounting system may then be fastened to and sustained by two rigid rectangular frames 47, 49 which are secured to each of the four rods 27 intermediate the two springs 15 on said rod. The eight springs 15 in such modified form of the invention should be arranged so that their midpoints are disposed in two spaced parallel planes and the instrument sustained by the frames 47, 49 should be positioned so that its center of gravity is in a plane midway between the said two planes. The operation of this modified form is similar to that of the first form.

While there have been described what are at present considered preferred embodiments of the invention, it will be obvious to those skilled in the art that various changes and modifications may be made therein without departing from the invention, and it is, therefore, aimed in the appended claims, to cover all such changes and modifications as fall within the true spirit and scope of the invention.

What is claimed is:

1. In a shock mount for a load, a volute spring made up of a coil of flat springy material, a tubular housing secured to the outer turn of said spring, a rod extending through the axis of said spring and secured to its innermost turn, means secured to the rod to sustain the load with its center of gravity substantially at the midpoint of the spring.

2. In a means to shock mount a load, at least three spaced springs disposed with their axes mutually parallel and their midpoints substantially in a plane normal to said axes, each spring made up of flat springy material coiled into a volute configuration, a housing assembly secured to the outermost turns of all of said springs, a rod extending axially through each of said springs and secured to the innermost turn thereof, a framework secured to said rods and adapted to sustain a load with its center of gravity substantially in the plane aforementioned which extends through the midpoints of the springs.

3. In a means to shock mount a load, at least three spaced parallel rods, a spring coiled about each of said rods with its innermost layer secured to the rod about which it is coiled, the midpoints of all of said springs being in a single plane normal to said rods, each of said springs made up of a flat springy material coiled into a volute configuration, a second similar spring coiled about each of said rods with its innermost layer secured to the rod about which it is coiled, the midpoints of said last mentioned springs being in a second single plane normal to said rods and parallel to and spaced from said first mentioned plane, a housing assembly secured to the outermost layers of all of said springs, a framework secured to all of said rods and adapted to sustain a load with its center of gravity substantially midway between the two planes aforesaid.

4. In a means to shock mount a load, a rod, two springs coiled about said rod with their innermost layers secured to said rod at points spaced from each other, each of said springs being made up of a flat springy material coiled into a volute configuration, a housing assembly secured to the outermost layer of said springs, load-sustaining means secured to said rod and capable of sustaining a load with its center of gravity substantially midway between the midpoints of said springs.

5. In a shock mount, a spring made up of a flat ribbon of springy material coiled into volute configuration, a spring housing about said spring, said housing including a tubular sleeve snugly encircling the outer turn of said spring and two rings secured to said sleeve and extending inwardly therefrom beyond at least part of said outer turn, a rod extending through the axis of said spring and rigidly secured to the inner turn thereof, the inner marginal edge of each of said rings crossing the edge of the adjacent turn of the spring substantially at an oblique angle.

6. In a shock mount as defined in claim 1, wherein the housing includes a tubular sleeve snugly encircling the outer turn of said spring and two rings secured to said sleeve and extending inwardly therefrom beyond at least part of said outer turn, the inner marginal edge of each of said rings crossing the edge of the adjacent turn of the spring substantially at an oblique angle.

QUENTIN FRAZIER.

REFERENCES CITED

The following references are of record in the file of this patent:

UNITED STATES PATENTS

| Number | Name | Date |
|---|---|---|
| 1,795,313 | Nies | Mar. 10, 1931 |
| 2,397,804 | Nakken et al. | Apr. 2, 1946 |